US011221284B2

(12) United States Patent
Anderson

(10) Patent No.: US 11,221,284 B2
(45) Date of Patent: Jan. 11, 2022

(54) STRUCTURAL HEALTH MONITORING SENSOR

(71) Applicant: Douglas Anderson, West Chester, PA (US)

(72) Inventor: Douglas Anderson, West Chester, PA (US)

( * ) Notice: Subject to any disclaimer, the term of this patent is extended or adjusted under 35 U.S.C. 154(b) by 0 days.

(21) Appl. No.: 16/876,340

(22) Filed: May 18, 2020

(65) Prior Publication Data

US 2020/0363304 A1 Nov. 19, 2020

Related U.S. Application Data

(60) Provisional application No. 62/849,715, filed on May 17, 2019.

(51) Int. Cl.
*G01N 3/08* (2006.01)
*G01N 3/06* (2006.01)

(52) U.S. Cl.
CPC ............ *G01N 3/08* (2013.01); *G01N 3/066* (2013.01); *G01N 2203/0075* (2013.01)

(58) Field of Classification Search
CPC ... G01N 3/08; G01N 3/066; G01N 2203/0075
USPC .......................................................... 73/862
See application file for complete search history.

(56) References Cited

U.S. PATENT DOCUMENTS

| | | | | |
|---|---|---|---|---|
| 4,507,170 A * | 3/1985 | Myhre | .................. | G01L 9/0051 216/100 |
| 4,520,339 A * | 5/1985 | Utsunomiya | ............. | G01L 1/22 177/211 |
| 6,951,143 B1 * | 10/2005 | Adderton | ................ | G01L 5/161 73/862.044 |
| 10,260,933 B2 * | 4/2019 | Kostic | .................. | G01G 19/445 |
| 2007/0255424 A1 * | 11/2007 | Leydet | ....................... | A61F 2/70 623/24 |
| 2013/0024137 A1 * | 1/2013 | Grassi | ........................ | G01L 3/04 702/43 |
| 2014/0096621 A1 * | 4/2014 | Bosscher | ................ | G01L 5/226 73/862.042 |
| 2015/0007664 A1 * | 1/2015 | Dirauf | ................... | G01L 1/2206 73/763 |
| 2016/0052584 A1 * | 2/2016 | Sasaki | ....................... | G01L 3/24 74/594.4 |
| 2020/0323524 A1 * | 10/2020 | Menon | ............... | A61B 17/0218 |

\* cited by examiner

*Primary Examiner* — Max H Noori
(74) *Attorney, Agent, or Firm* — Ken Bower; Lyman Smith; Patent Service Associates, Inc

(57) ABSTRACT

A sensor array can differentiate acceptable tensile and flexural stresses in a beam from stress patterns that indicate a fracture in the beam. At least three strain gauges, with additional pairs of strain gauges added for redundancy, can be used. The single, central strain gauge is adhered to the beam directly over, and with the sensing elements parallel to the neutral axis of the beam. The pairs of strain gauges are adhered to the beam parallel to the sensing elements of the single strain gauge on opposite sides of and equidistant from the neutral axis. The single strain gauge senses the tensile stress in the beam. The pairs of gauges sense the bending strain in the beam. A non-zero value in the sum of the strains measured by each of the pair of strain gauges indicates a potential structural health issue with the beam.

16 Claims, 9 Drawing Sheets

STRUCTURAL HEALTH MONITORING SENSOR

CROSS-REFERENCE TO RELATED APPLICATIONS

This application claims the benefit of U.S. provisional patent application No. 62/849,715, filed May 17, 2019, the contents of which are herein incorporated by reference.

BACKGROUND OF THE INVENTION

1. Field of the Invention

Embodiments of the invention relate generally to methods and systems for structural health monitoring. More particularly, embodiments of the invention relate to methods and systems that can indicate the strain on a beam, regardless of the variable load, thereby more accurately measuring the structural health of the beam.

2. Description of Prior Art and Related Information

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

There are 600,000 bridges in the US. It is reported that 47,000 of these bridges are structurally deficient. These bridges are inspected manually every two years costing millions of dollars for inherently inaccurate manually taken data and leaving two years for the structural health of the structure to change for the worse without detection. Strain gauges have been used to measure the strain in beams for decades. Aircraft wings and industrial cranes receive an annual inspection for structural integrity and buildings are inspected after major earthquakes.

Strain gauges heretofore have measured the strain on the beam as well as the strain produced by the load. The instant invention indicates the strain on the beam regardless of the variable load thereby more accurately measuring the structural health of the beam.

SUMMARY OF THE INVENTION

Embodiments of the present invention provide a structural health sensor comprising a central strain gauge; at least one pair of strain gauges; and interface electronics operable to detect a change in resistance of the central strain gauge and each of the at least one pair of strain gauges, wherein each of the at least one pair of strain gauges disposed in a linear array with the central strain gauge; each of the at least one pair of strain gauges having a first strain gauge and a second strain gauge; and each of the first strain gauge and the second strain gauge of each of the at least one pair of strain gauges being spaced equidistant from the central strain gauge.

Embodiments of the present invention further provide a structural health sensor comprising a central strain gauge; at least two pair of strain gauges; and interface electronics operable to detect a change in resistance of the central strain gauge and each of the at least two pair of strain gauges, wherein each of the at least two pair of strain gauges disposed in a linear array with the central strain gauge; a first pair of the at least two pair of strain gauges having a first strain gauge and a second strain gauge; a second pair of the at least two pair of strain gauges having a third strain gauge and a fourth strain gauge; each of the first strain gauge and the second strain gauge being spaced equidistant a first distance from the central strain gauge; and each of the third strain gauge and the fourth strain gauge being spaced equidistant a second distance from the central strain gauge.

Embodiments of the present invention also provide a method for measuring a structural health of a device comprising disposing a central strain gauge on a neutral axis of the device; disposing at least one pair of strain gauges in a linear array with the central strain gauge; and electrically connecting the central strain gauge and the at least one pair of strain gauges to interface electronics operable to detect a change in resistance of the central strain gauge and each of the at least one pair of strain gauges, wherein each of the at least one pair of strain gauges having a first strain gauge and a second strain gauge; and each of the first strain gauge and the second strain gauge of each of the at least one pair of strain gauges being spaced equidistant from the central strain gauge.

An objective of the instant invention is to provide a sensor array that differentiates acceptable tensile and flexural stresses in a beam from stress patterns that indicate a fracture in the beam. Monitoring the safety of bridges, airplanes, cranes and building structures with instrumentation and in real time is more accurate, timely and less costly than manual inspection.

Embodiments of the present invention requires at least three strain gauges. Additional pairs of strain gauges can be added for redundancy in case of strain gauge failure. The single strain gauge is adhered to the beam directly over and with the sensing elements parallel to the neutral axis of the beam. The pairs of strain gauges are adhered to the beam parallel to the sensing elements of the single strain gauge on opposite sides and equidistant from the neutral axis. The single strain gauge senses the tensile stress in the beam.

The pairs of gauges sense the bending strain in the beam. A difference in the sum of the strains measured by each of the pair of strain gauges indicates a shift in the location of the neutral axis of the beam, indicating a potential structural health issue with the beam.

These and other features, aspects and advantages of the present invention will become better understood with reference to the following drawings, description and claims.

BRIEF DESCRIPTION OF THE DRAWINGS

Some embodiments of the present invention are illustrated as an example and are not limited by the figures of the accompanying drawings, in which like references may indicate similar elements.

Figure 1:
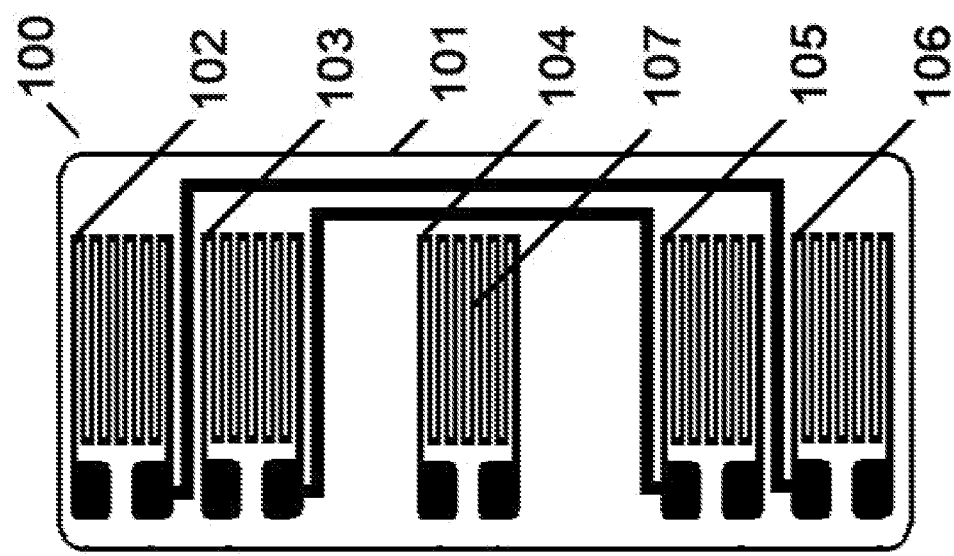
FIG. 1 illustrates a sensor array according to an embodiment of the present invention.

Unless otherwise indicated illustrations in the figures are not necessarily drawn to scale.

The invention and its various embodiments can now be better understood by turning to the following detailed description wherein illustrated embodiments are described. It is to be expressly understood that the illustrated embodiments are set forth as examples and not by way of limitations on the invention as ultimately defined in the claims.

DETAILED DESCRIPTION OF THE PREFERRED EMBODIMENTS AND BEST MODE OF INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention and is not intended to limit the invention to the specific embodiments illustrated by the figures or description below.

As is well known to those skilled in the art, many careful considerations and compromises typically must be made when designing for the optimal configuration of a commercial implementation of any system, and in particular, the embodiments of the present invention. A commercial implementation in accordance with the spirit and teachings of the present invention may be configured according to the needs of the particular application, whereby any aspect(s), feature (s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

Broadly, embodiments of the present invention provide a sensor array that can differentiate acceptable tensile and flexural stresses in a beam from stress patterns that indicate a fracture in the beam. At least three strain gauges, with additional pairs of strain gauges added for redundancy, can be used. The single, central strain gauge is adhered to the beam directly over and with the sensing elements parallel to the neutral axis of the beam. The pairs of strain gauges are adhered to the beam parallel to the sensing elements of the single strain gauge on opposite sides and equidistant from the neutral axis. The single strain gauge senses the tensile stress in the beam. The pairs of gauges sense the bending strain in the beam. A difference in the sum of the strains measured by each of the pair of strain gauges indicates a potential structural health issue with the beam.

FIG. 1 describes the construction of a sensor array 100 comprising the following elements. An odd-number of strain gauges 102, 103, 104, 105 and 106 are adhered to substrate 101 with their sensing elements 107 parallel to the short edges of substrate 101. In this embodiment, five strain gauges are shown, although any odd number may be used. Strain gauges 102, 103, 104, 105 and 106 are arranged in a linear array. Single strain gauge 104 is at the center of the substrate 101. Strain gauge pairs 102/106 and 103/105 are each equidistant from the center of the substrate 101. One leg of each strain gauge pair is connected by wire or other electrical connection to one leg of the other strain gauge in the pair.

There are several types of strain gauges, two of which are foil gauges, and piezoelectric gauges which are both suitable for use in the present invention. Foil gages measure a change in resistance with strain. Piezoelectric gages measure a change in piezoelectric potential with strain. Interface electronics 200, are configured for operation with foil strain gauges. Piezoelectric gages require a processor-based interface circuit.

The requirement for the material of the substrate 101 is a material that is mechanically stable with a low modulus of elasticity thereby stretching much more easily than the strain gauges. Polyimide is an example of a suitable material. The strain gauges 102, 103, 104, 105 and 106 are adhered to the substrate 101 either with an appropriate adhesive or during the manufacturing process. An epoxy adhesive is normally recommended by strain gauge manufacturers as is a substrate cleaning material used before the adhering operation and a protective coating to protect the strain gauges 102, 103, 104, 105 and 106 from adverse ambient conditions in operation. The adhesive used to adhere the substrate to the beam is the same as the recommendation of the strain gauge manufacturer.

The strain gauges 102, 103, 104, 105 and 106 could alternatively be adhered directly to the beam 200 without substrate 101. This configuration is not discussed.

Figure 2A:
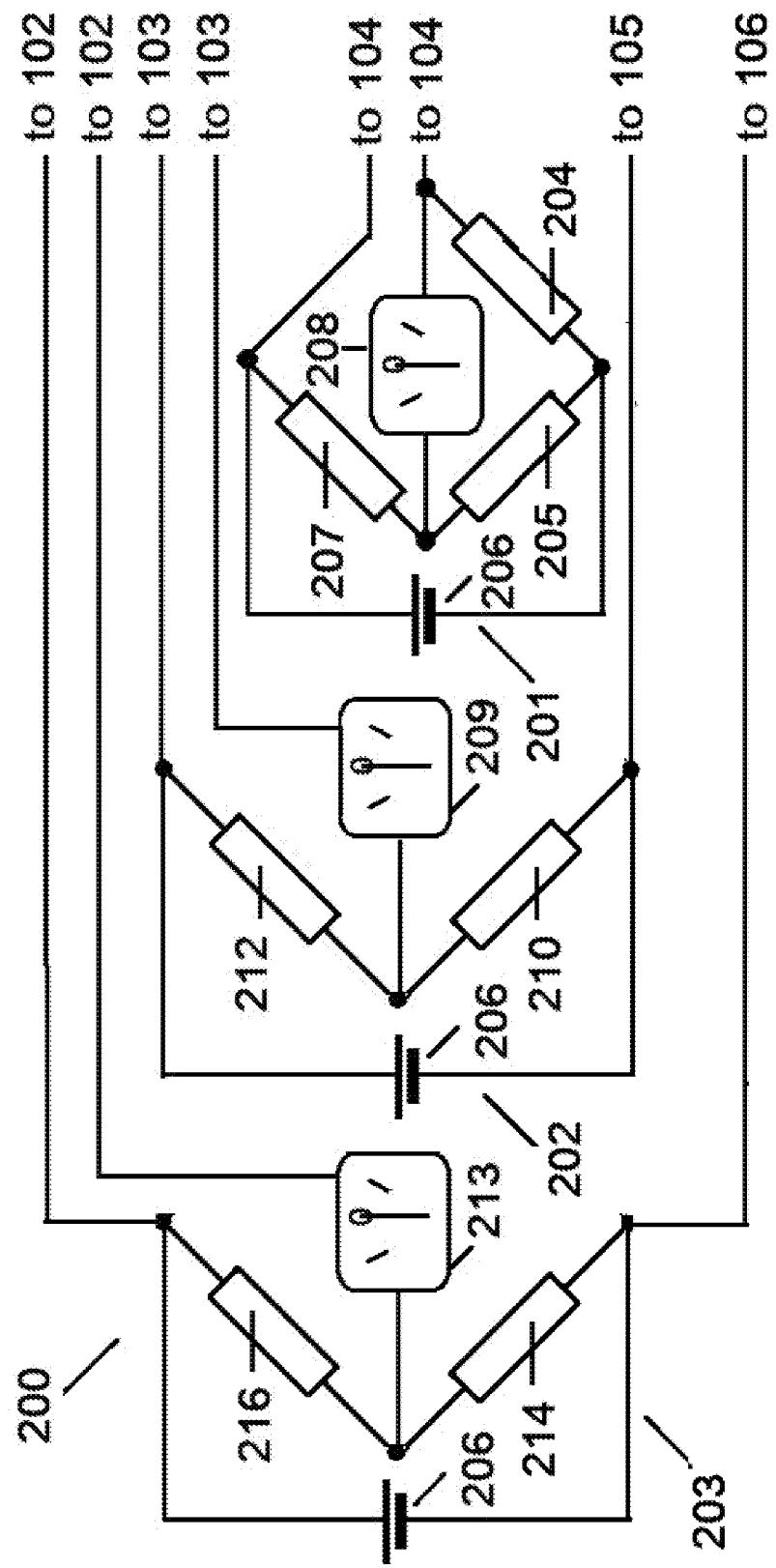
FIG. 2A shows the sensor array of FIG. 1 electrically connected to first interface electronics.

FIG. 2A shows interface electronics 200 with the connections to the sensor array 100 indicated to the right of the figure. The electronics are comprised of center Wheatstone bridge 201a, first Wheatstone bridge 202a and second Wheatstone bridge 203a. Center Wheatstone bridge 201a has four legs including center strain gauge 104, and resistors 204, 205 and 207. Center Wheatstone bridge is powered by power source 206 and has output measured by meter 208a. In practice, meter 208 would be replaced by communication electronics (un-shown). First Wheatstone bridge 201a has four legs including first strain gauge pair 103 and 105, and resistors 210, and 212. First Wheatstone bridge 201a is powered by power source 206 and has output measured by meter 209a. In practice meter 209a would be replaced by communication electronics (un-shown). Second Wheatstone bridge 203a has four legs including second strain gauge pair 102 and 106, and resistors 214, and 216. Second Wheatstone bridge 203a is powered by power source 206 and has output measured by meter 213a. In practice meter 213 would be replaced by communication electronics (un-shown). For example, elements 208, 209, 213 may also refer to communication electronics that permit the transmission of an output signal from each of the Wheatstone bridges.

The communication electronics may include any conventional method for wirelessly transmitting information, including Wi-Fi, 3G, 4G, 5G, LTE, SMS or the like. In some embodiments, the power source 206 may further supply power to the communication electronics. The communication electronics may continuously or periodically send information regarding a status of the strain gauges. In some embodiments, a processor and memory may be included for storing information regarding measurements from the strain gauges. The processor may process the data and store the processed data. In some embodiments, the communication electronics may remain inactive unless a change is detected by the processor in one or more of the strain gauges. Upon such detection, the processor may use the communication electronics to send the data to one or more remote recipients.

Figure 2B:
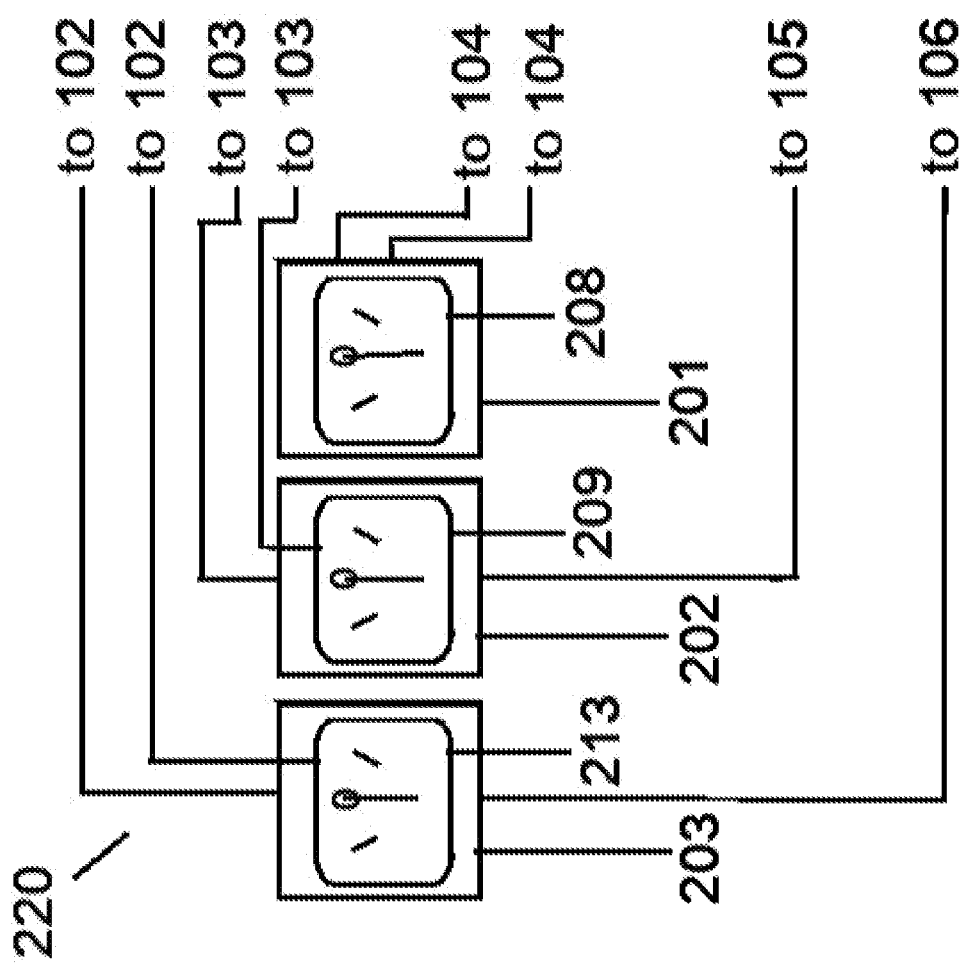
FIG. 2B shows the sensor array of FIG. 2A with the three Wheatstone bridges symbolized by blocks with the corresponding output meter attached to the top of the block.

FIG. 2B shows a block diagram of the interface electronics of FIG. 2A. Blocks 201, 202 and 203 represent Wheatstone bridges 201a, 202a, and 203a respectively. Meters 208, 209, and 213 represent meters 208a, 209a and 213a respectively. There is no input to the meters, therefore, the meters 209, 209, and 213 show no reading.

Figure 3:
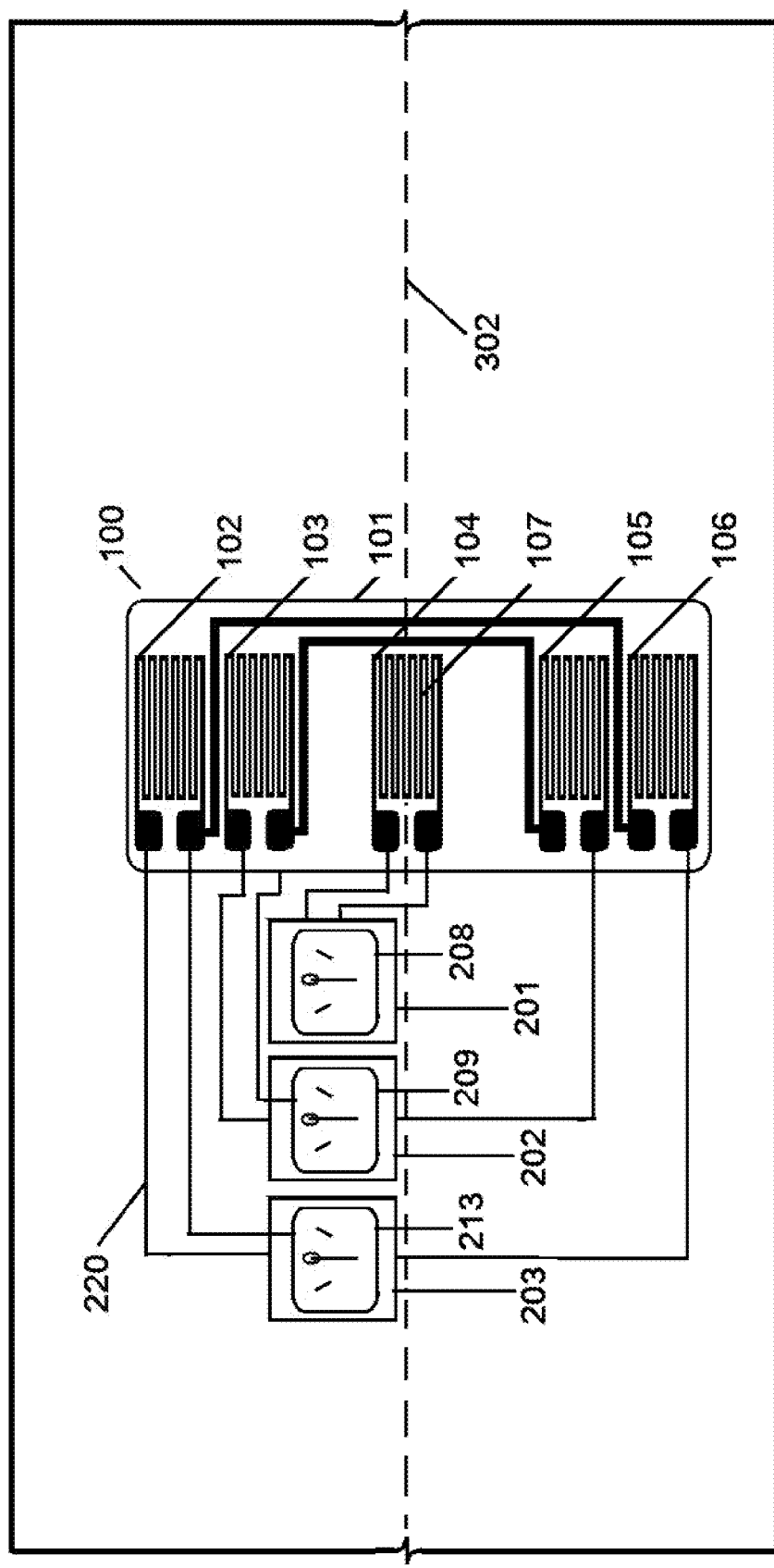
FIG. 3 shows the sensor array of FIG. 1 electrically connected to second interface electronics, adhered to a beam, under no stress and the output meter reading as shown.

FIG. 3 shows sensor array 100 connected electrically to interface electronics 220, mounted to beam 301, having a straight-line neutral axis 302 because the beam has no externally applied forces.

Figure 4:
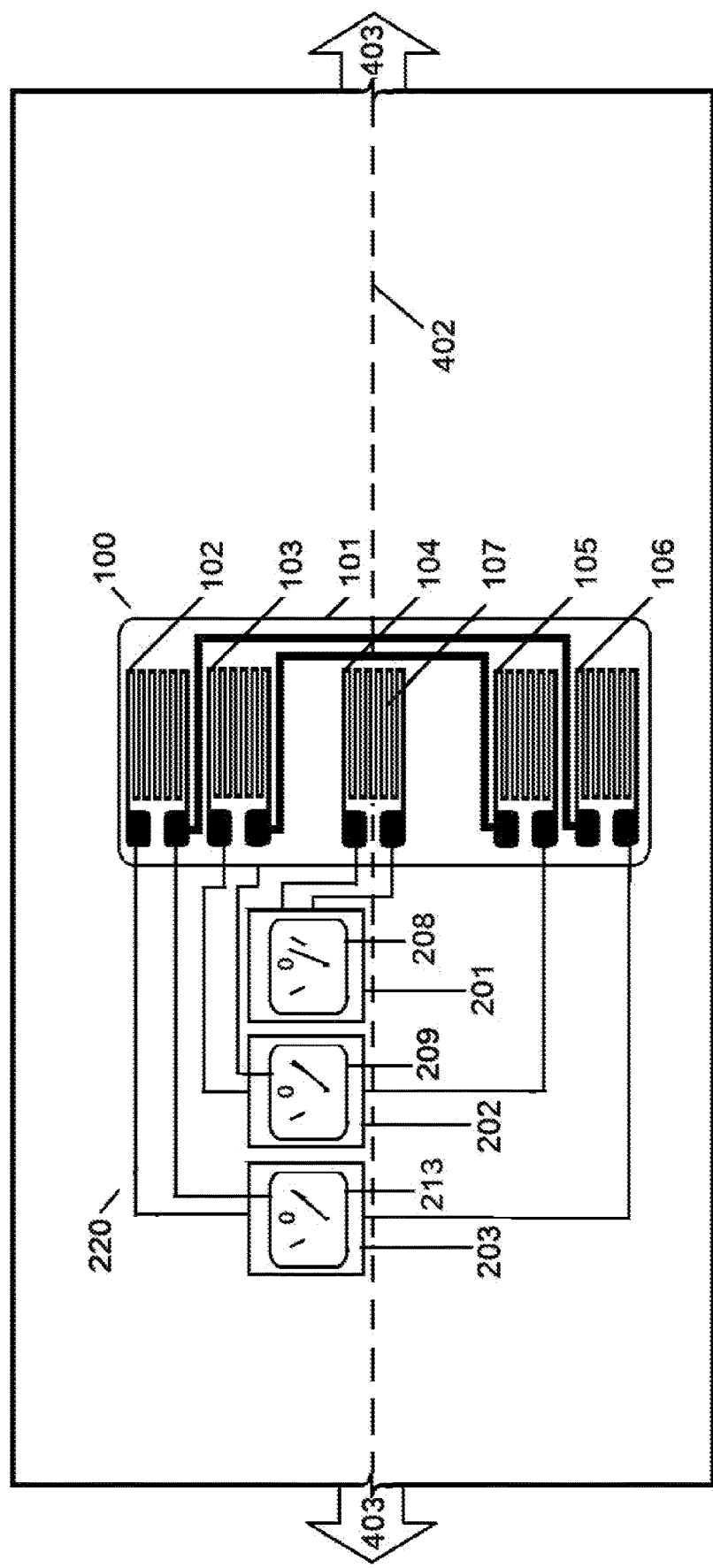
FIG. 4 shows the sensor array of FIG. 1 electrically connected to second interface electronics, adhered to a beam, under tensile stress and the output meter reading as shown.

FIG. 4 shows sensor array 100 connected electrically to interface electronics 220, mounted to beam 401, having a straight-line neutral axis 402 because the beam has only externally applied tensile forces 403. Gauge 104 and the pairs of strain gauges 103/105 and 102/106 measure the tensile strain. The reading on meters 209 and 213 is twice that of meter 208 because of the wiring of the gauge pairs 103/105 and 102/106.

Figure 5:
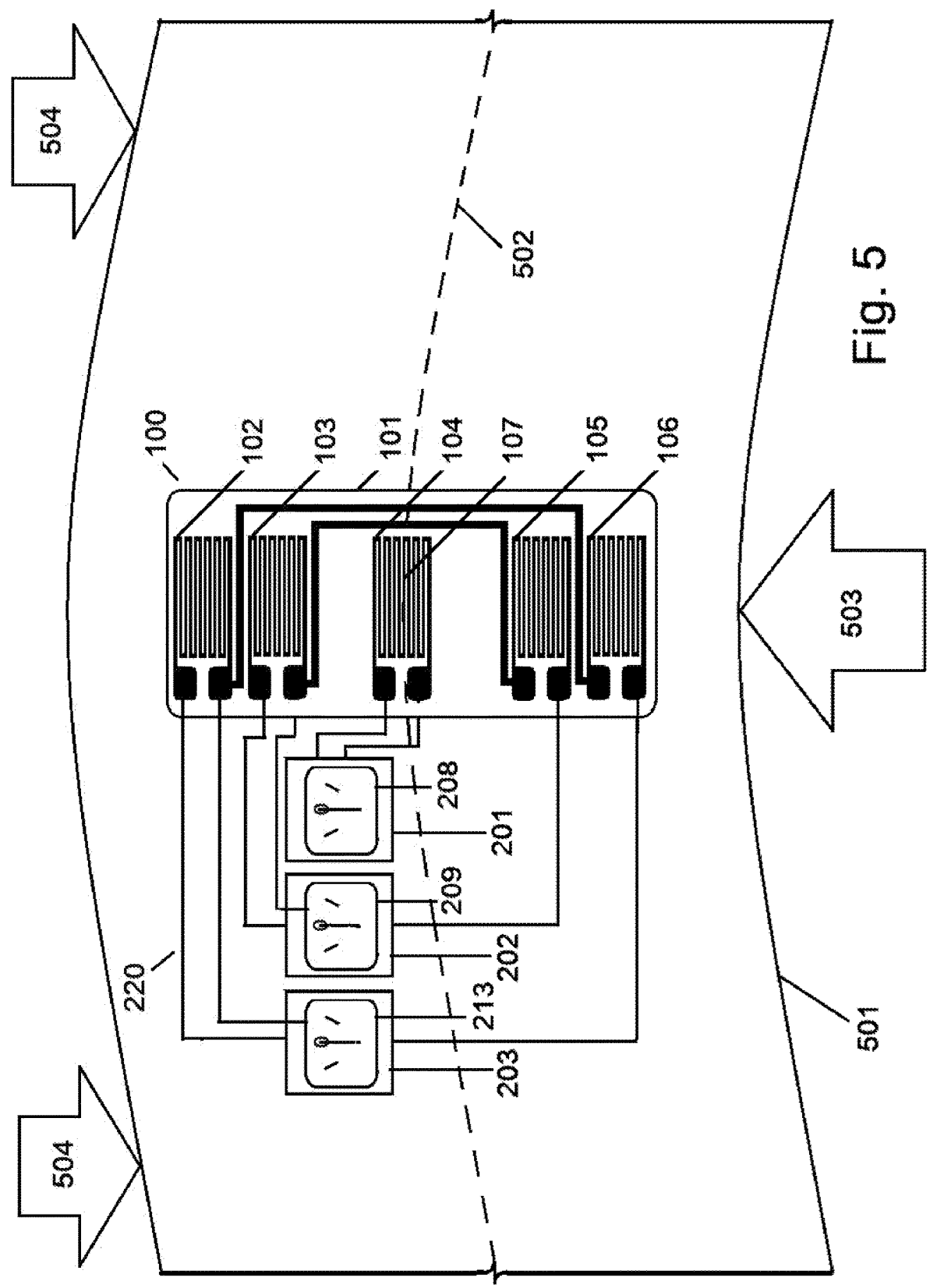
FIG. 5 shows the sensor array of FIG. 1 electrically connected to second interface electronics, adhered to a beam, under bending stress and the output meter reading as shown.

FIG. 5 shows sensor array 100 connected electrically to interface electronics 220, mounted to beam 501, having a curved neutral axis 502 because the beam has externally applied bending forces 503 and 504. The pairs of strain gauges 103/105 and 102/106 become remain balanced causing meters 209 and 213 to measure zero readings. Meter 208 also has a zero reading.

Figure 6:
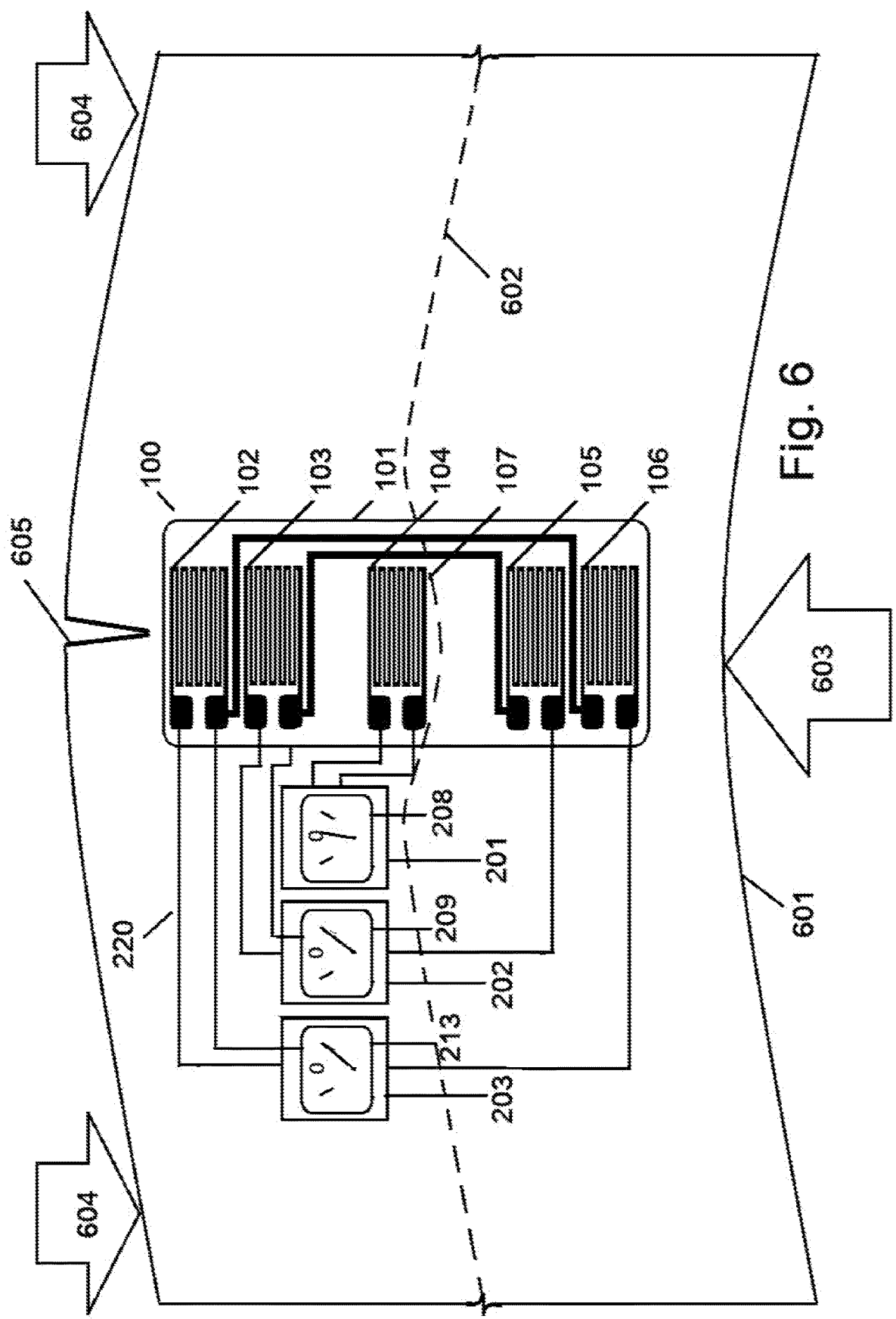
FIG. 6 shows the sensor array of FIG. 1 electrically connected to second interface electronics, adhered to a damaged beam, under bending stress and the output meter reading as shown.

FIG. 6 shows sensor array 100 electrically connected to interface electronics 220, mounted to beam 601, having a curved neutral axis 602 because the beam has externally applied bending forces 603 and 604. The neutral axis 602 is curved in a direction away from crack 605. The pairs of strain gauges 103/105 and 102/106 become out of balance because of the resulting shift in the neutral axis causing meters 209 and 213 to measure elevated readings. Meter 208 has a negligible reading.

Figure 7:
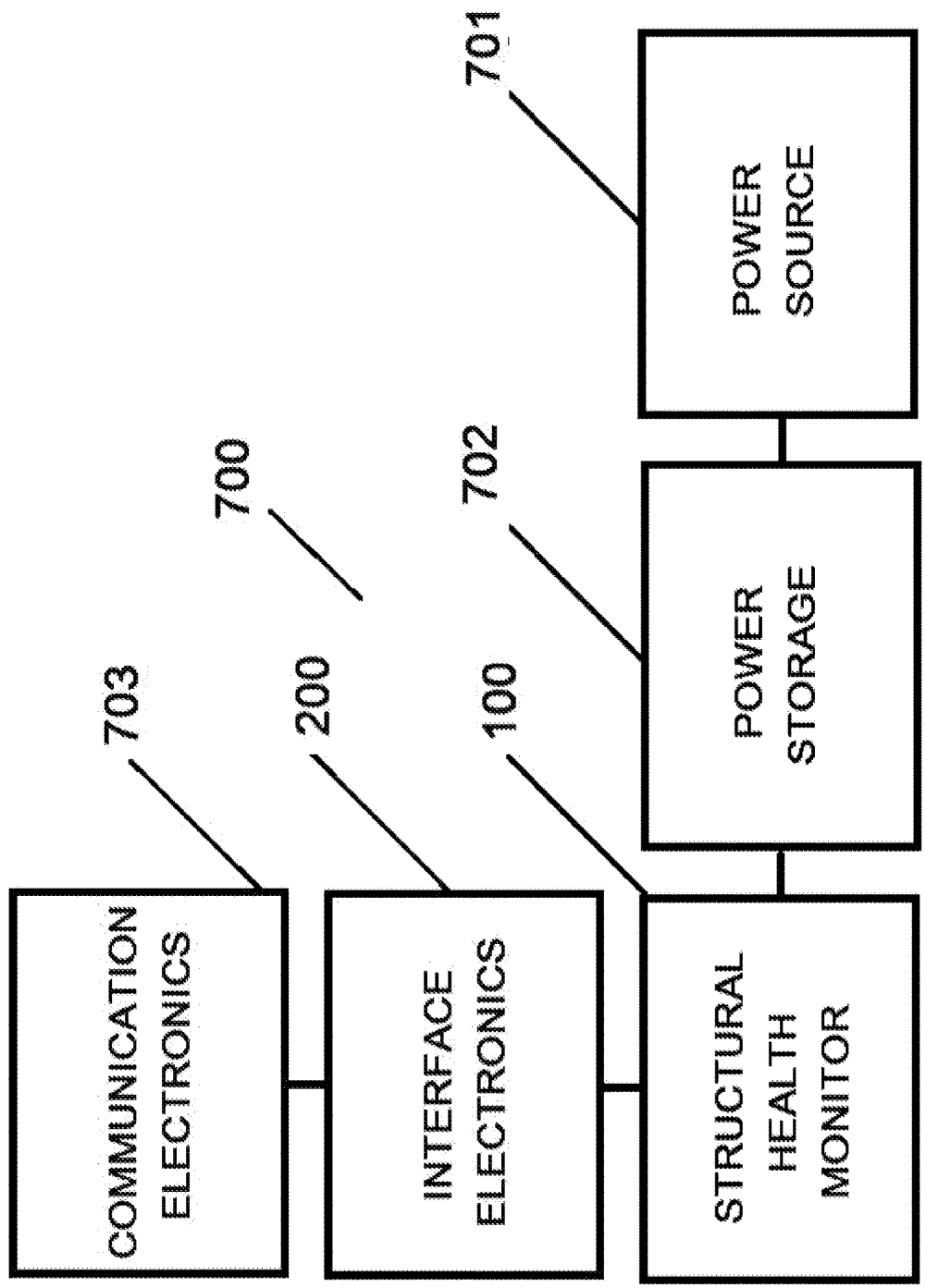
FIG. 7 shows a system block diagram of a typical sensor array system installation.

FIG. 7 shows a block diagram of a sensor array system 700. The system is comprised of a power source 701, power storage 702 which is necessary in case the power source 701 is comprised of solar cells or another intermittent power source. The most common rechargeable battery for power storage use is currently the lithium ion battery but many others are available or under development. The power storage 703 would likely be excluded in the case of aircraft, crane, building or any built in or nearby source which would likely be continuous. The sensor array system also comprises a sensor array 100, interface electronics 200 and communication electronics 703 (un-shown) which could use Blue Tooth or any currently used or future short range communications protocol.

Figure 8:
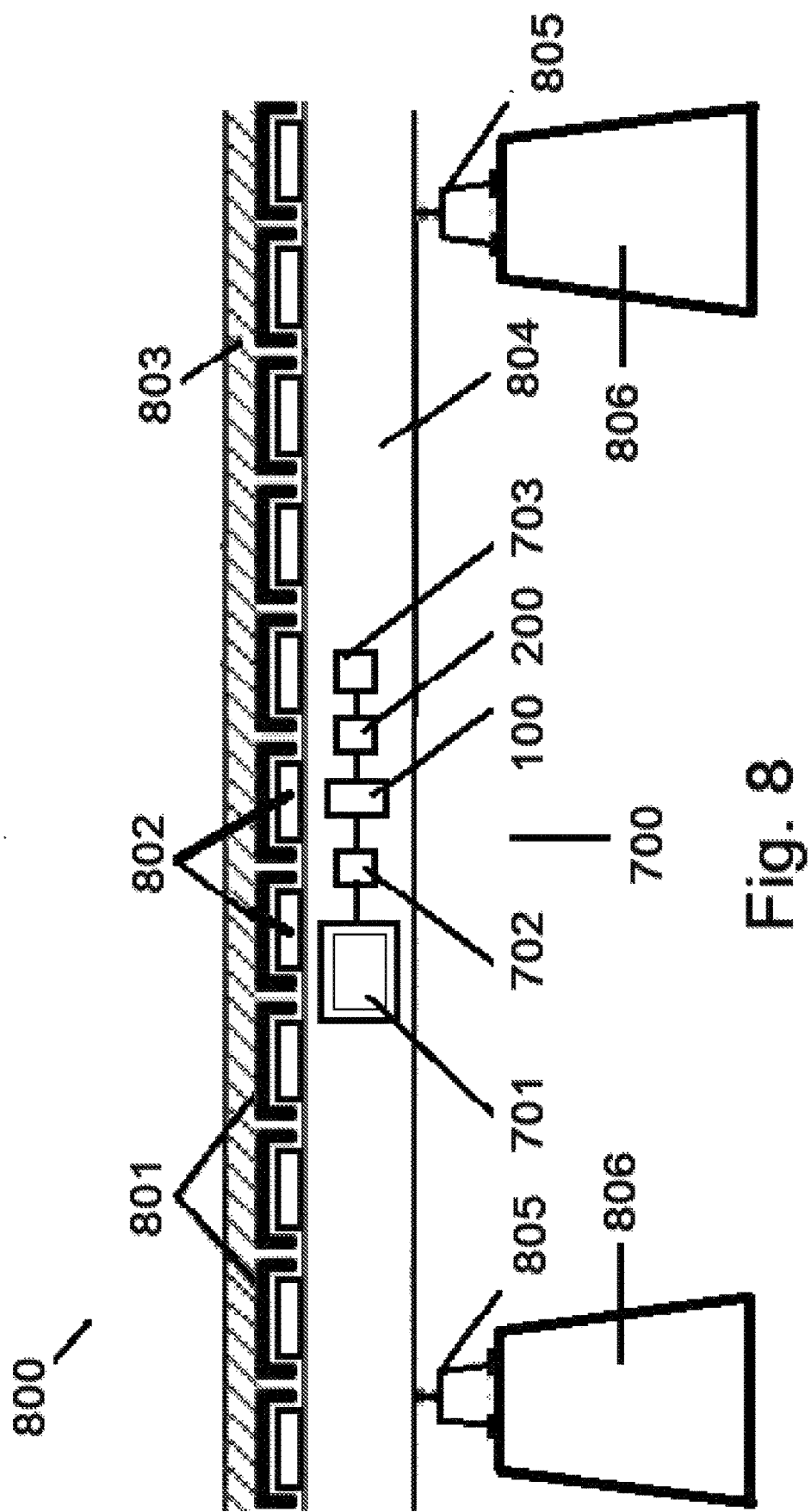
FIG. 8 shows a typical sensor array system installation on a bridge.

FIG. 8 shows a sensor array system 700 mounted on a bridge 800. The bridge is comprised of deck support channels 801, air space 802, deck 803, beam 804, bearings 805 and piers 806. The sensor array system is comprised of power source 701, power storage 702, sensor array 100, interface electronics 200 and communications electronics 703.

Table 1, below, summarizes the output of the sensor array system output as a function of the strain condition of the beam, illustrating how the strain on the beam can be seen regardless of the variable load

TABLE 1

| Beam Condition | FIG. | Meter 208 Reading | Meter 209 Reading | Meter 213 Reading | Net Output |
|---|---|---|---|---|---|
| No Strain | 3 | 0 | 0 | 0 | 0 |
| Tensile Strain | 4 | X | 2X | 2X | 2X − (2*X) = 0 |
| Bending Strain | 5 | 0 | 0 | 0 | 0 |
| Cracked Strain | 6 | Y | >>Y | >>Y | 2Y − (2*Y) >> Y |

For the case with only Tensile Strain, the "net output" is zero when you subtract twice the output on Meter 208 from Meters 209 or 213. The center strain gauge is to normalize the output from the gauge pairs for tensile strain. Each strain gauge of the pair of gauges will measure the same tensile strain as the center gauge, and their output is summed by the wiring. Therefore, to always correct for tensile strain, twice the center gauge output is always subtracted from the gauge pair outputs.

When there is tensile strain along with bending strain, since twice the output of the center gauge is subtracted from the outputs on Meters 209 or 213, the remainder is then due solely to the bending strain. Since the gauge pair output is summed, the bending strain will generate no output (neutral axis normal) if the beam is intact, and an output (neutral axis deviation) if the beam is damaged.

It should be understood that, in the table above, a zero reading may or may not be a true zero reading, depending on the "tuning" of the Wheatstone bridge. The resistors of the Wheatstone bridge (such as resistors 204, 205 and 207 for the bridge that includes the center strain gauge) may be chosen to cause a zero reading when the strain gauge (or pair of strain gauges) are used as the 4th or the 3rd and 4th resistors of the Wheatstone bridge, as shown in the Figures. Regardless of the no strain reading, the determination of cracked strain will be the same.

All the features disclosed in this specification, including any accompanying abstract and drawings, may be replaced by alternative features serving the same, equivalent, or similar purpose, unless expressly stated otherwise. Thus, unless expressly stated otherwise, each feature disclosed is one example only of a generic series of equivalent or similar features.

Claim elements and steps herein may have been numbered and/or lettered solely as an aid in readability and understanding. Any such numbering and lettering in itself is not intended to and should not be taken to indicate the ordering of elements and/or steps in the claims.

Many alterations and modifications may be made by those having ordinary skill in the art without departing from the spirit and scope of the invention. Therefore, it must be understood that the illustrated embodiments have been set forth only for the purposes of examples and that they should not be taken as limiting the invention as defined by the following claims. For example, notwithstanding the fact that the elements of a claim are set forth below in a certain combination, it must be expressly understood that the invention includes other combinations of fewer, more, or different ones of the disclosed elements.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what incorporates the essential idea of the invention.

What is claimed is:

1. A structural health sensor comprising:
   a central strain gauge;
   at least one pair of strain gauges; and
   interface electronics operable to detect a change in resistance of the central strain gauge and each of the at least one pair of strain gauges, wherein
   each of the at least one pair of strain gauges disposed in a linear array with the central strain gauge, the linear array aligned along both opposing side edges of each of the at least one pair of strain gauges and the central strain gauge;
   each of the at least one pair of strain gauges having a first strain gauge and a second, strain gauge; and
   each of the first strain gauge and the second strain gauge of each of the at least one pair of strain gauges being spaced equidistant from the central strain gauge.

2. The structural health sensor of claim 1, wherein the at least one pair of strain gauges includes at least two pair of strain gauges.

3. The structural health sensor of claim 1, wherein the interface electronics include Wheatstone bridges.

4. The structural health sensor of claim 3, wherein a first Wheatstone bridge is configured to include the central strain gauge as one of its resistors.

5. The structural health sensor of claim 3, wherein a first Wheatstone bridge is configured to include the first strain gauge and the second strain gauge as two of its resistors.

6. The structural health sensor of claim 3, further comprising voltage meters for detecting a voltage at each of the Wheatstone bridges.

7. The structural health sensor of claim 1, further comprising a substrate having the central strain gauge and each of the at least one pair of strain gauges mounted thereupon.

8. The structural health sensor of claim 1, further comprising communication electronics for sending a measurement from the central strain gauge and each of the at least one pair of strain gauges to a remote location.

9. A structural health sensor comprising:
   at least one pair of strain gauges; and
   interface electronics operable to detect a change in resistance of each of the at least two pair of strain gauges, wherein each of the at least one pair of strain gauges disposed in a linear array, the linear array aligned along both opposing side edges of each of the at least one pair of strain gauges;
   a first pair of the at least one pair of strain gauges having a first strain gauge and a second strain gauge; and
   each of the first strain gauge and the second strain gauge being spaced equidistant a first distance from a central axis.

10. The structural health sensor of claim 9, further comprising a central strain gauge disposed along the central axis and disposed in a linear array with each of the at least one pair of strain gauges.

11. The structural health sensor of claim 10, wherein the interface electronics include Wheatstone bridges and wherein a first Wheatstone bridge is configured to include the central strain gauge as one of its resistors.

12. The structural health sensor of claim 11, wherein a second Wheatstone bridge is configured to include the first strain gauge and the second strain gauge as two of its resistors.

13. The structural health sensor of claim 12, further comprising a second pair of the at least one pair of strain gauges having a third strain gauge and a fourth strain gauge, wherein each of the third strain gauge and the fourth strain gauge being spaced equidistant a second distance from the central axis, wherein a third Wheatstone bridge is configured to include the third strain gauge and the fourth strain gauge as two of its resistors.

14. The structural health sensor of claim 9, further comprising a substrate having each of the at least one pair of strain gauges mounted thereupon.

15. The structural health sensor of claim 9, further comprising communication electronics for sending a measurement from each of the at least one pair of strain gauges to a remote location.

16. The structural health sensor of claim 13, wherein the first distance is half the second distance.

* * * * *